(12) United States Patent
Tsubai et al.

(10) Patent No.: US 7,065,208 B2
(45) Date of Patent: Jun. 20, 2006

(54) ELECTRONIC APPARATUS WITH PIVOTABLE DISPLAY

(75) Inventors: Mitsuo Tsubai, Tenri (JP); Kenji Sugahara, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 265 days.

(21) Appl. No.: 10/246,487

(22) Filed: Sep. 19, 2002

(65) Prior Publication Data
US 2003/0059037 A1    Mar. 27, 2003

(30) Foreign Application Priority Data
Sep. 19, 2001 (JP) ............... P2001-285347
Sep. 19, 2001 (JP) ............... P2001-285348

(51) Int. Cl.
*H04M 1/00* (2006.01)
(52) U.S. Cl. ............ 379/428.03; 358/296; 379/433.13; 455/575.3
(58) Field of Classification Search ........... 379/428.03, 379/433.04, 433.13; 455/90.1, 90.3, 575.1, 455/575.3; 358/296
See application file for complete search history.

(56) References Cited

U.S. PATENT DOCUMENTS

| | | | | |
|---|---|---|---|---|
| 5,182,650 A | * | 1/1993 | Inoue et al. | 358/296 |
| 5,278,993 A | * | 1/1994 | Reiff et al. | 455/575.3 |
| 5,414,444 A | | 5/1995 | Britz | |
| 6,434,370 B1 | * | 8/2002 | Kodera et al. | 455/90.1 |
| 6,487,396 B1 | * | 11/2002 | Sassi | 455/90.1 |
| 6,741,287 B1 | | 5/2004 | Fuchimukai et al. | |
| 6,850,784 B1 | * | 2/2005 | SanGiovanni | 455/575.1 |

FOREIGN PATENT DOCUMENTS

| | | |
|---|---|---|
| JP | 11-212668 | 8/1999 |
| JP | 2000-115343 | 4/2000 |
| JP | 2000-227763 | 8/2000 |
| JP | 2000-232503 | 8/2000 |
| JP | 2002-228128 | 8/2000 |
| JP | 2000-261697 | 9/2000 |
| JP | 2001-242993 | 9/2001 |
| WO | WO-96/29809 A1 | 9/1996 |

* cited by examiner

*Primary Examiner*—Harry S. Hong
(74) *Attorney, Agent, or Firm*—Birch, Stewart, Kolasch & Birch, LLP

(57) ABSTRACT

An electronic machine, a display apparatus and a communication apparatus are provided which are capable of minimizing an increase in the dimensions of an apparatus body which is ascribed to the improvement of the controllability of the apparatus and an increase in the sizes of a display screen. A case unit is pivotably joined to an apparatus body by a pivot, and an upper operating element of a cross key and function keys are provided so that these parts are positioned on the axis of the pivot. Thus, an operating force occurring when the upper operating element and function keys are operated is exerted on the axis of the pivot.

19 Claims, 14 Drawing Sheets

ELECTRONIC APPARATUS WITH PIVOTABLE DISPLAY

BACKGROUND OF THE INVENTION

1. Field of the Invention

The present invention relates to an electronic apparatus, a display apparatus and a communication apparatus.

2. Description of the Related Art

The related art communication apparatuses, such as a telephone set and a facsimile apparatus include a communication apparatus mounted with a liquid crystal display apparatus capable of showing thereon around one to three pieces of information, as an operating panel adapted to show thereon a telephone number of an opposite person obtained through pre-communication information notification service, a name pre-registered correspondingly to this telephone number, and a telephone number inputted by a key operating action or a shortened dial registered telephone number.

In a proposed technique in recent years, a communication apparatus mounted with a large-sized liquid crystal display; showing on the liquid crystal display apparatus a picture image based on facsimile data received from a communication line; and formed so that a desired picture image alone can be selected and outputted onto paper has been available. A communication apparatus mounted with such a large-sized liquid crystal display as shown in FIGS. 20A–20C has been proposed in which a case unit a having a liquid crystal display e therein is provided pivotably on an apparatus body b, and in which function keys c corresponding to the content to be shown on the liquid crystal display e and a cross key d for giving instructions to alter the content to be shown on the liquid crystal display e are provided on the apparatus body b.

However, in such a communication apparatus as described above, the function keys c and cross key d on the apparatus body b are arranged in positions away from the liquid crystal display e. Therefore, the controllability of the function keys c and cross key d operated as the content to be shown on the liquid crystal display e is observed is low. Moreover, as the dimensions of the liquid crystal display e increase, an excess space, in which the function keys c and cross key d are provided, on the apparatus body b is lost. Therefore, it becomes necessary that a special space be provided so as to provide these keys on the apparatus body b, and this causes the apparatus body b to be enlarged.

SUMMARY OF THE INVENTION

The invention has been made in view of these circumstances, and provides an electronic apparatus, a display apparatus and a communication apparatus capable of minimizing an increase, which is ascribed to the improvement of the controllability of an operation of the apparatus and an increase in the sizes of a display screen, in the dimensions of an apparatus body thereof.

The invention provides an electronic apparatus comprising:

a main body;

a case unit joined to the apparatus main body so as to be angularly displaced, the case unit having a display screen provided on a surface thereof, and an operating unit provided on the surface, for giving instructions to alter contents to be shown on the display screen.

According to the invention, a display screen and an operating unit operated by depressing or touching to give instructions to alter the contents to be shown on the display screen are provided on the surface of a case unit joined angularly displaceably to the apparatus body. This enables the controllability of the operating unit operated with the content to be shown on the display screen observed to be improved, and an increase in dimensions, which is ascribed to an increase in sizes of the display screen, of the apparatus body to be held down.

The invention further provides an electronic apparatus in which, in addition to the above-described structure, the case unit is disposed on an upper surface of the apparatus main body and joined thereto so that the case unit can be angularly displaced between a first position in which the case unit is raised and a second position in which the case unit is laid down substantially along the upper surface of the apparatus.

According to the invention, the display screen and the operating unit adapted to give instructions to alter the content to be shown on the display screen are provided on the surface of the case unit set on the upper surface of the apparatus body and joined thereon so that the case unit can be turned toward the front surface of the apparatus body. This enables improvement of the controllability of the operating unit operated with the content to be shown on the display screen observed in its first position, and an increase, which is ascribed to an increase in the sizes of the display screen, in the dimensions of the machine body to be held down.

In the invention it is preferable that a pivot is disposed in a proximal side portion of the case unit and the operating unit is disposed nearly directly above the axis of the pivot.

According to the invention, the display screen and the operating unit adapted to give instructions to alter the contents to be shown on the display screen are provided on the surface of the case unit pivotably joined to the apparatus body, and the operating unit nearly the pivot provided in the lower portion (an operator side or proximal side) of the case unit. Therefore, a pivotal movement of the case unit made by an operation of the operating unit can be minimized.

In the invention it is preferable that the operating unit is disposed in a lower corner of a surface of the case unit in the first position.

According to the invention, the display screen and the operating unit for giving instructions to alter the content to be shown on the display screen are provided on a proximal side right portion of the case unit pivotably joined to the apparatus body. The operating unit is positioned nearly the pivot provided on the proximal side of the case unit. Therefore, the pivotal movement of the case unit made by an operation of the operating unit can be minimized.

In the invention it is preferable that an upper operating element of the operating unit is provided nearly directly above the axis of the pivot.

According to the invention, the display screen and the operating unit for giving instructions to alter the content to be shown on the display screen are provided on the surface of the case unit pivotably joined to the apparatus body. The upper operating element of the operating unit is mounted on the pivot provided in the lower portion of the case unit. Therefore, the pivotal movement of the case unit made by the operation of the operating unit can further be minimized.

In the invention it is preferable that a plane shape of a contour of the operating unit is substantially elliptic in which operating unit upper, lower, left and right operating elements are connected together so that a distance between the upper and lower operating elements is set shorter than that of between the left and right operating elements.

According to the invention, the surface of the case unit joined pivotably to the machine body is provided thereon with the display screen and the operating unit for giving instructions to alter the content to be shown on the display screen, the operating unit being made of a substantially elliptic key in which the upper, lower, left and right operating elements are connected together so that a distance between the upper and lower operating elements is set shorter than that of between the left and right operating elements. Owing to an operation of the operating unit, a pivotal movement of the case unit can further be minimized.

In the invention it is preferable that a substantially arcuate sliding contact member extending around the pivot is provided on a rear surface of the case unit, a retaining force obstructing a pivotal movement of the case unit being applied to the sliding contact member, the operating unit and sliding contact member being arranged in positions of different rotational actions.

According to the invention a display screen and the operating unit for giving instructions to alter the content to be shown on the display screen are provided on the surface of the case unit joined pivotably to an apparatus body, and the substantially arcuate rib to which a retaining force obstructing a pivotal movement of the case unit is applied is provided on the portion of a rear surface of the case unit which is in a position of a rotational action different from the position of a rotational action of the operating unit. Therefore, when the operating unit is operated, an eccentric action is generated, and a pivotal movement of the case unit due to the operation of the operating unit can thereby be minimized.

The invention provides a display apparatus angularly displaceably joined to an electronic apparatus, comprising a display screen disposed on a surface of the display apparatus; and an operating unit for giving instructions to alter contents to be shown on the display screen, the operating unit being provided nearly directly above an axis of a pivot.

According to the invention, the display screen and the operating unit for giving instructions to alter the content to be shown on the display screen are provided on the same surface of the display apparatus joined pivotably to the electronic apparatus, the operating unit being provided above the axis of a pivot. Therefore, it becomes possible to improve the controllability of an operation of the operating unit carried out as the content to be shown on the display screen is observed, minimize an increase in the dimensions of an apparatus body which is ascribed to an increase in the sizes of the display screen, and minimize a pivotal movement of the display apparatus caused by an operation of the operating unit.

In the invention it is preferable that the operating unit is a key operated by depressing or touching.

In the invention it is preferable that the operating unit is a unit operated by angular displacement.

The invention provides a communication apparatus, comprising:
a main body; and
a case unit pivotably joined to the apparatus body,
the case unit including a display screen for displaying a picture image based on data sent from a communication line and an operating unit provided on a surface of the case unit for scrolling picture images displayed on the display screen, on the basis of an operation of the operating unit, the operating unit being provided nearly directly above an axis of a pivot.

According to the invention, the case unit joined pivotably to the apparatus body is provided, the surface of the case unit being provided thereon with the display screen showing thereon a picture image based on the data sent from the communication line, and the operating unit for scrolling the picture image shown on the display screen, the operating unit being provided above the axis of the pivot. Therefore, it becomes possible to improve the controllability of an operation of the operating unit carried out as the content to be shown on the display screen is observed, minimize an increase in the dimensions of the apparatus body which is ascribed to an increase in the sizes of the display screen, and minimize a pivotal movement of the display apparatus caused by an operation of the operating unit.

The invention provides a communication apparatus comprising:
a main body; and
a case unit pivotably joined to the apparatus main body, including a display screen for displaying a menu picture image based on data sent from a communication line, and an operating unit provided on the surface of the case unit for moving a cursor, which is shown on the display screen, on the basis of an operation of the operating unit, the operating unit being provided above the axis of a pivot.

According to the invention, the case unit pivotably joined to the apparatus body is provided, and the surface of the case unit is provided with the display screen on which a menu picture image based on the data sent from the communication line is shown, and the operating unit for moving the cursor shown with the menu picture image on the display screen, the operating unit being provided above the axis of the pivot. Therefore, it becomes possible to improve the controllability of an operation of the operating unit carried out as the content to be shown on the display screen is observed, minimize an increase in the dimensions of the apparatus body which is ascribed to an increase in the size of the display screen, and minimize a pivotal movement of the display apparatus caused by an operation of the operating unit.

In the invention it is preferable that the communication apparatus further comprises a handset disposed on the apparatus body, for communicating with another apparatus connected thereto via a communication line, wherein the case unit is provided on one side of the handset, and the operating unit is provided in a position away from the side on which the handset is provided.

According to the invention, the case unit pivotably joined to the apparatus body is provided on one side of the handset placed on the apparatus body, and a display screen and the operating unit are provided on the surface of the case unit, the operating unit being provided in the position on a pivot of the case unit which is away from the side on which the handset is provided. Therefore, an operation of the operating unit carried out as the content to be shown on the display screen is observed can be effected without causing the operation of the operating unit to be deteriorated during the use of the handset.

In the invention it is preferable that a handset for telephone communication including a microphone and a speaker is removably installed on the left-hand side of the apparatus main body, the case unit is located to the right of the handset on the apparatus main body, the operating unit is located in a portion of the case unit more to the proximal side than the display screen and toward the right-hand end thereof, and the apparatus main body further includes another operating unit located to the right of the case unit.

According to the invention, the display screen and the operating unit for giving instructions to alter the content to be shown on the display screen are provided on the surface of the case unit pivotally joined to the apparatus body, or on that of a display apparatus. Therefore, it becomes possible to improve the controllability of an operation of the operating unit carried out as the content to be shown on the screen is observed, while minimizing an increase in the dimensions of the apparatus body which is ascribed to an increase in the size of the display screen. Especially, in an electronic apparatus and a communication apparatus used on a desk, such as a facsimile apparatus and a telephone set, the operating unit can be operated smoothly as what is shown on the display screen is kept easily seen.

According to the invention, the operating unit is provided nearly or on the pivot, so that a pivotal movement of the case unit caused by an operation of the operating unit can be minimized. This enables the inconveniences, which are ascribed to the provision of the operating unit on the pivotably provided case unit or display apparatus, to be eliminated.

According to the invention, an elliptic key in which the upper, lower, left and right operating elements ate connected together is used as the operating unit, and the distance between the upper and lower operating elements is set shorter than that of between the left and right operating elements, so that a pivotal movement of the case unit due to an operation of the operating unit can be minimized. Therefore, the inconveniences occurring due to the provision of the operating unit on the pivotably joined case unit can be eliminated.

According to the invention, the display screen and the operating unit for giving instructions to alter the content to be shown on the display screen are provided on the surface of the case unit joined pivotably to the apparatus body, and the substantially arcuate rib to which a retaining force obstructing a pivotal movement of the case unit is applied is provided on the rear surface of the case unit and on a point of application of pivotal action different from that of the operating unit. Owing to this arrangement, an eccentric action is generated on the pivot during an operation of the operating unit, and a pivotal movement of the case unit caused by an operation of the operating unit can thereby be minimized. Therefore, the inconveniences occurring due to the provision of the operating unit on the pivotably joined case unit can be eliminated.

BRIEF DESCRIPTION OF THE DRAWINGS

Other and further objects, features, and advantages of the invention will be more explicit from the following detailed description taken with reference to the drawings wherein:

FIGS. 20A to 20C are explanatory drawings showing an external appearance and construction of a facsimile apparatus, a related art example, wherein FIG. 20A is a perspective view with a case unit laid down, FIG. 20B is a perspective view of the same facsimile apparatus with the case unit raised, and FIG. 20C is a plan view of the same facsimile apparatus with the case unit laid down.

DETAILED DESCRIPTION OF THE PREFERRED EMBODIMENTS

Figure 1:
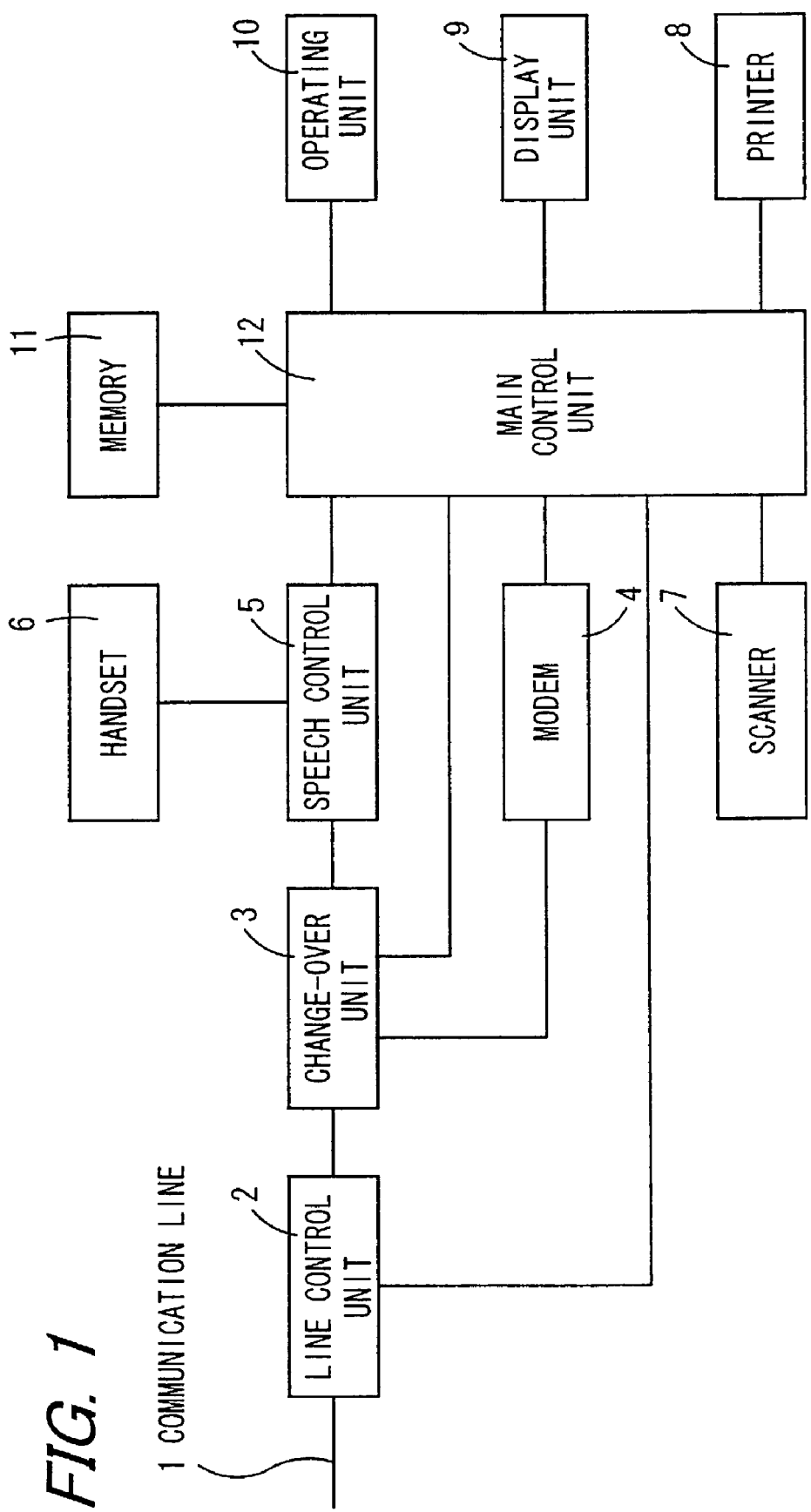
FIG. 1 is a function block diagram showing the construction of a facsimile apparatus, a mode of embodiment of the invention.

Now referring to the drawings, preferred embodiments of the invention are described below.

Figure 2A:
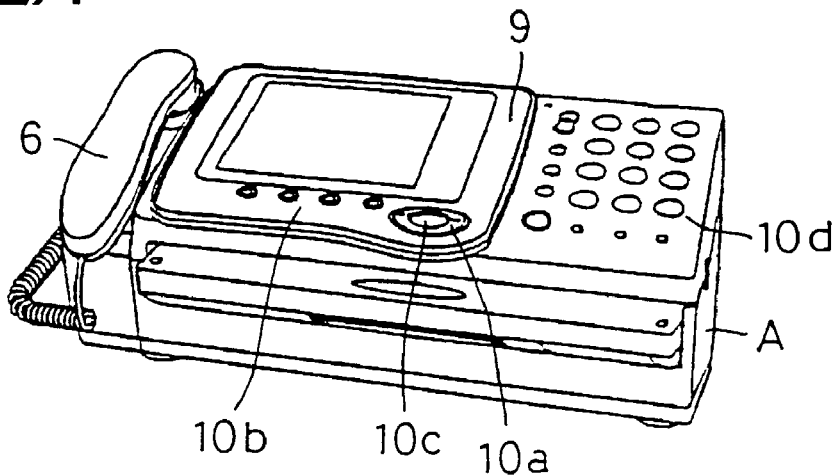
FIGS. 2A to 2C are explanatory drawings showing an external appearance and construction of the same facsimile apparatus.
Figure 2B:
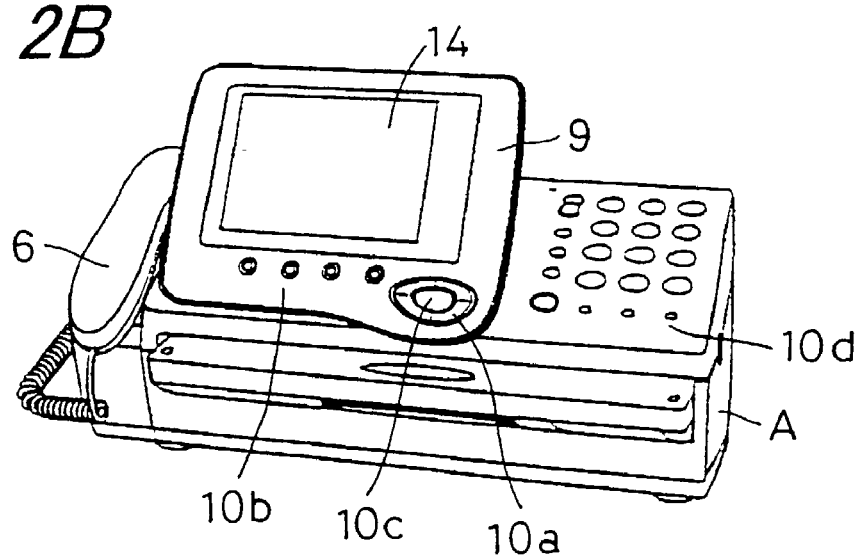
Figure 2C:
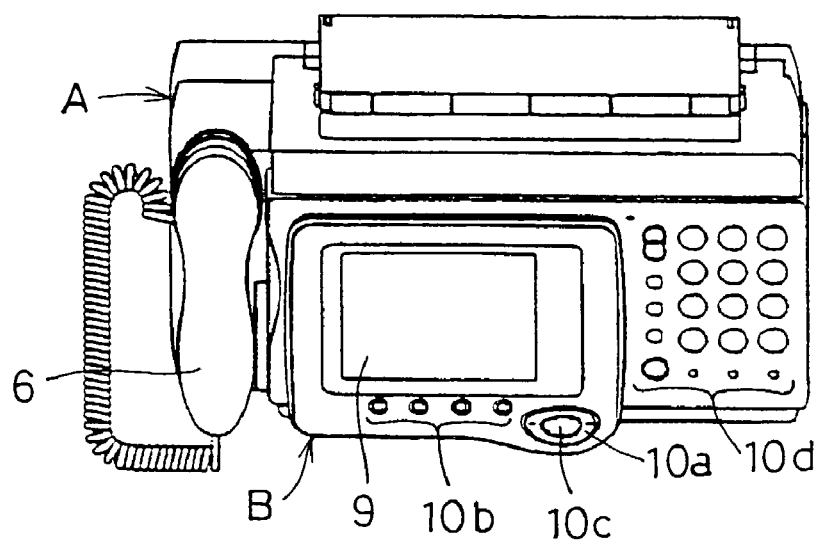
Figure 3A:
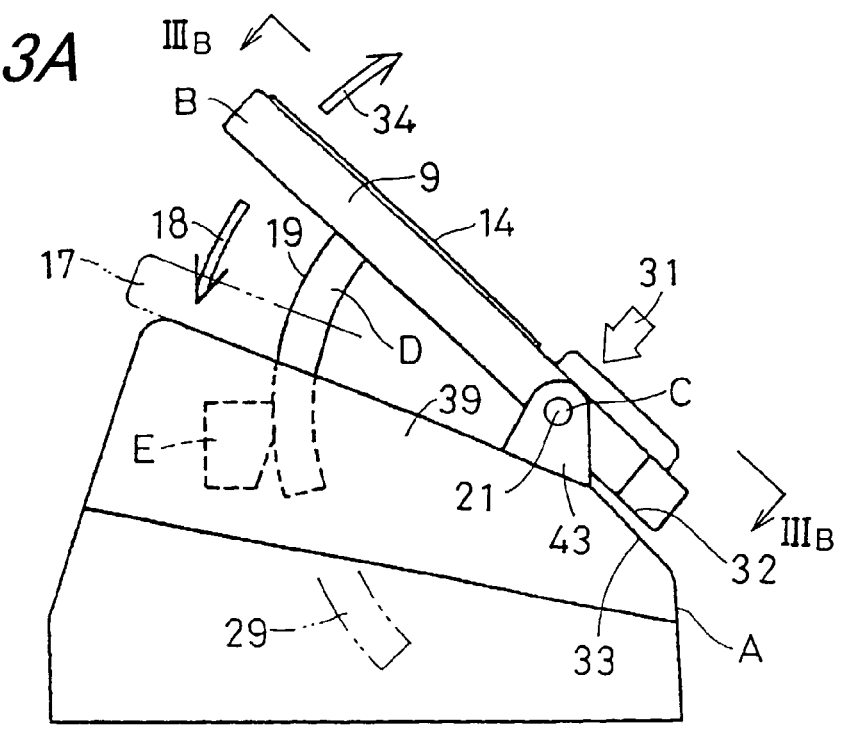
FIG. 3A and FIG. 3B are an explanatory drawing showing the construction of a principal portion of the same facsimile apparatus.
Figure 3B:
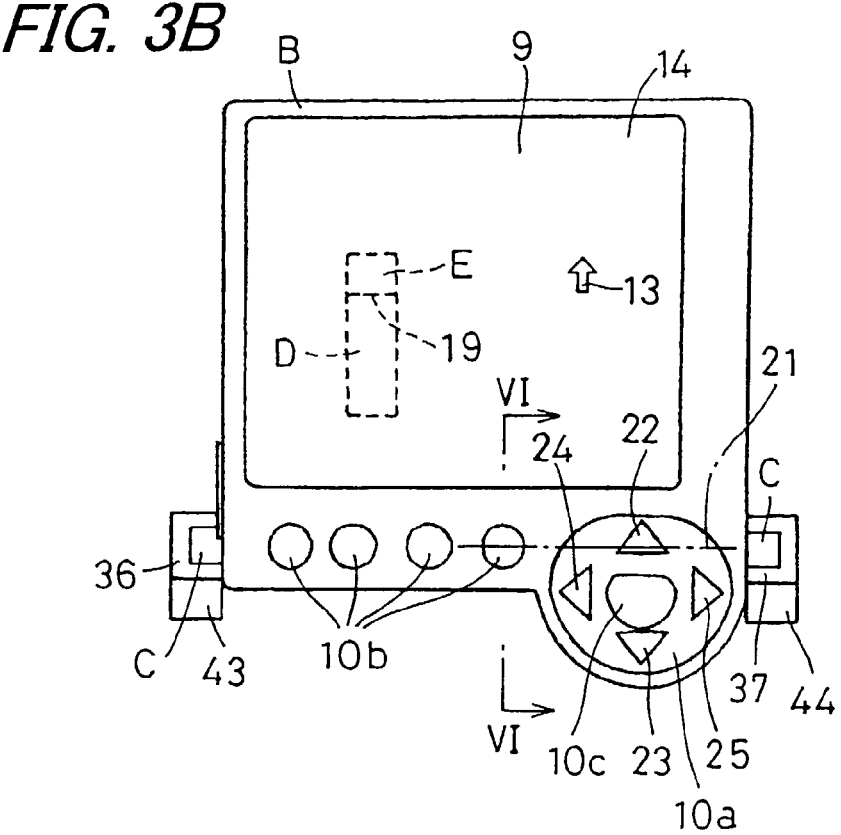
Figure 4:
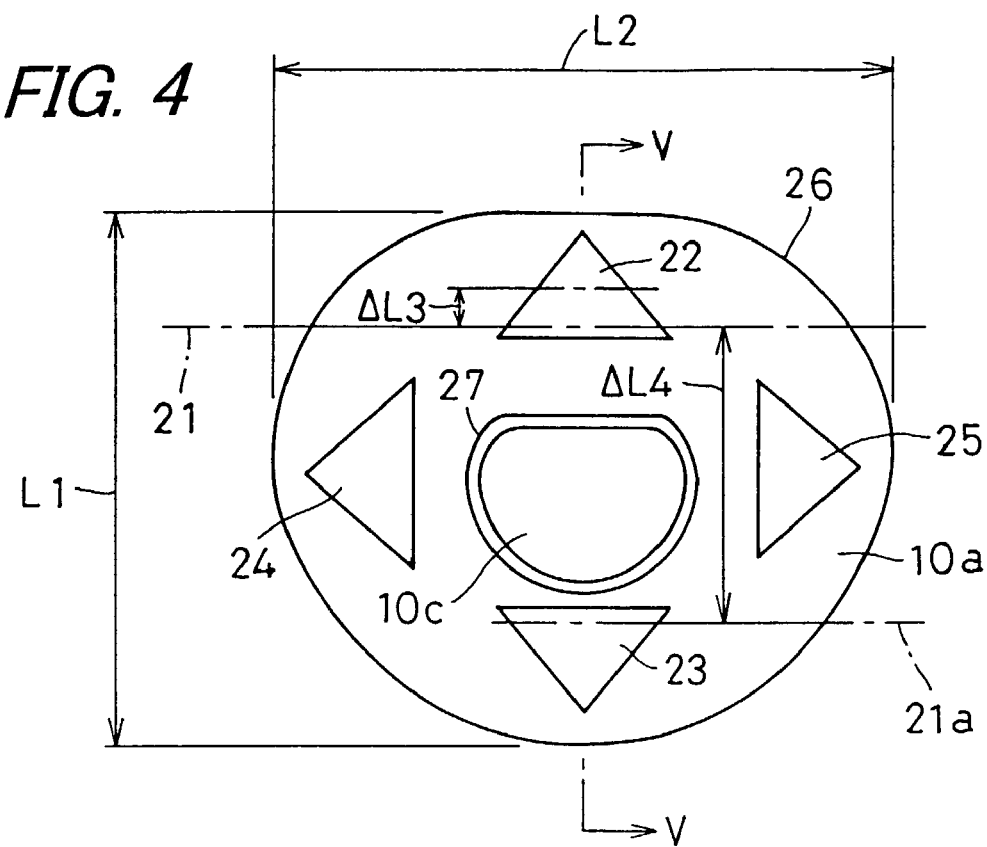
FIG. 4 is an enlarged view of a cross key 10a and a start key 10c in FIG. 3B.
Figure 5:
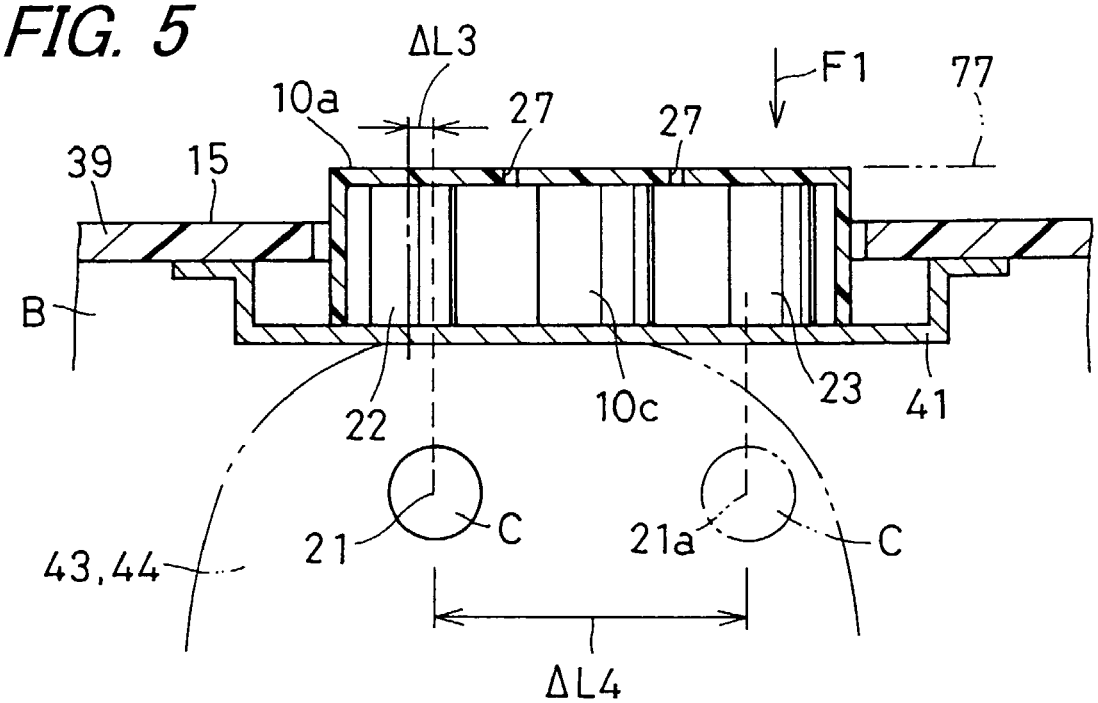
FIG. 5 is a simplified sectional vies taken along the line V—V in FIG. 4.
Figure 6:
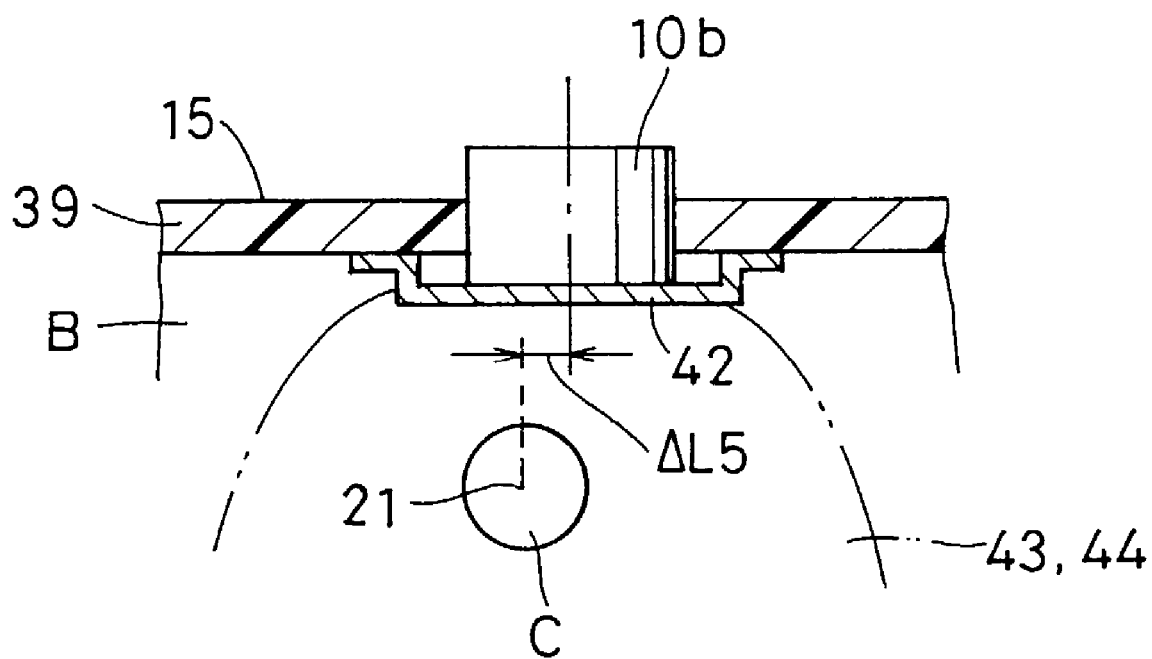
FIG. 6 is a simplified sectional view taken along the line VI—VI in FIG. 3B.
Figure 7:
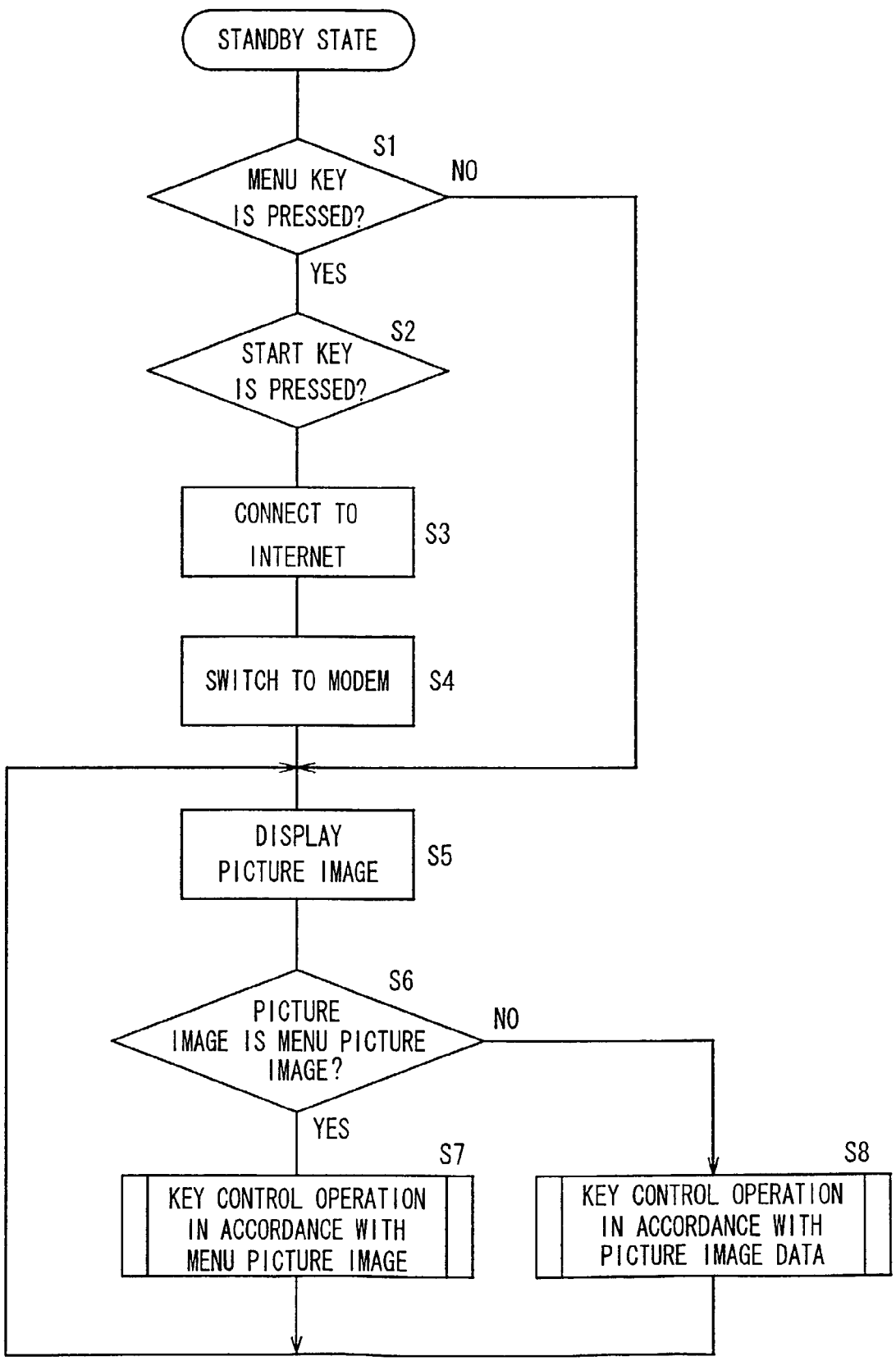
FIG. 7 is a flow chart showing the controlling of an operation during the displaying of a picture image in the same facsimile apparatus.
Figure 8:
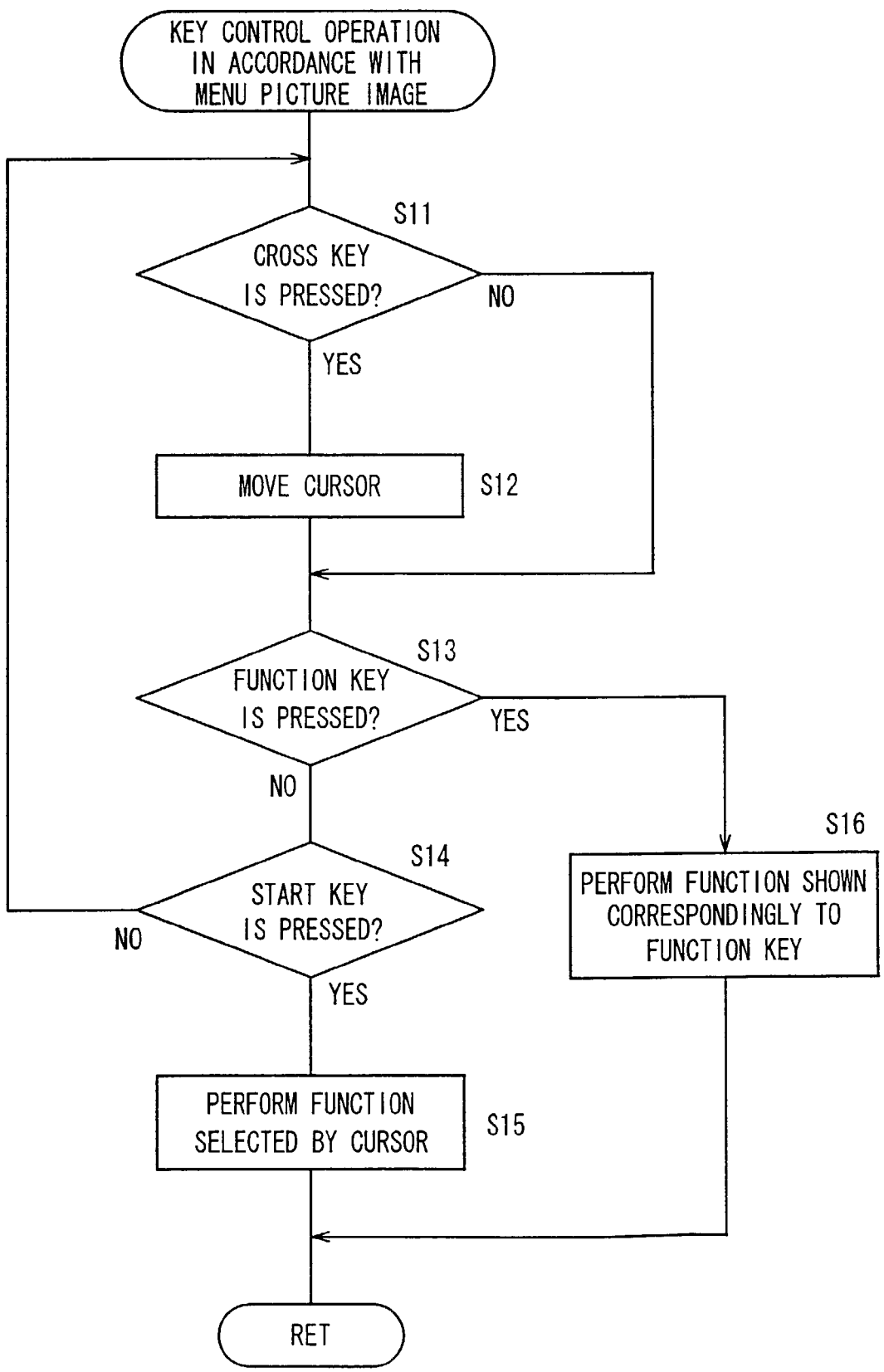
FIG. 8 is a flow chart showing the controlling of an operation during the displaying of a picture image in the same facsimile apparatus.
Figure 9:
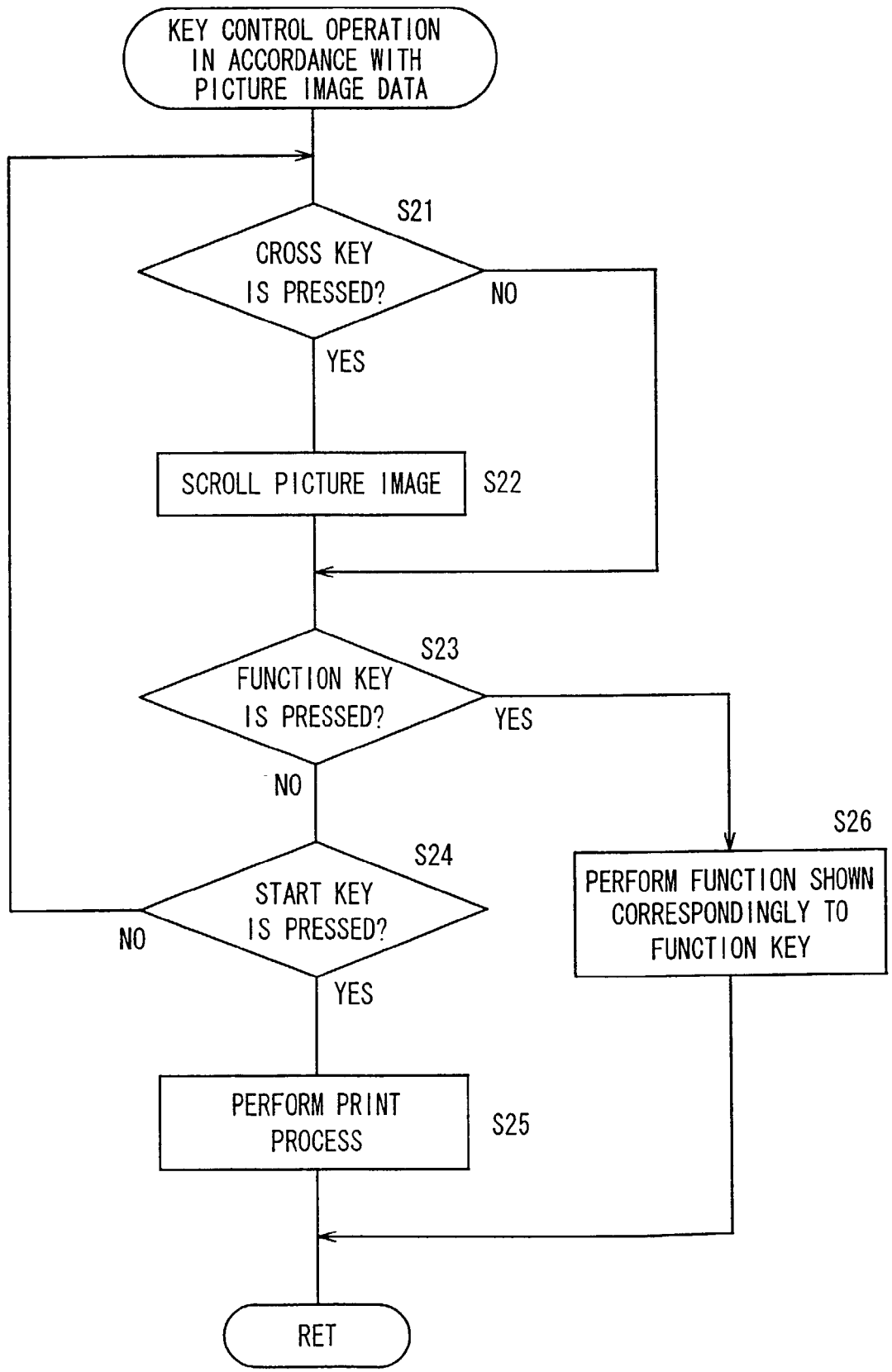
FIG. 9 is a flow chart showing the controlling of an operation during the displaying of a picture image in the same facsimile apparatus.

FIG. 1 is a function block diagram showing the construction of a facsimile apparatus constituting a mode of embodiment of the invention, and FIGS. 2A to 2C are explanatory drawings showing an external appearance and construction of the same facsimile apparatus, wherein FIG. 2A is a perspective view showing a state of a case unit B in a second position in which the case unit B is laid down, FIG. 2B is a perspective view showing a state of the case unit B in a first position in which the case unit B is raised, and FIG. 2C is a plan view showing the case unit B laid down in its second position. FIGS. 3A and 3B are explanatory views showing the construction of the principal part of the facsimile apparatus. FIG. 3A is a left side elevational view of the facsimile apparatus and FIG. 3B is a front elevational view taken along the line IIIB—IIIB in FIG. 3A and showing the case unit B for a display 9 in the facsimile apparatus in its state of use in its first position as shown by solid lines in FIG. 3A. FIG. 4 is an enlarged view of a cross key 10a and a start key 10c in FIG. 3B. FIG. 5 is a simplified sectional view taken along the line V—V in FIG. 4. FIG. 6 is a simplified sectional view taken along the line VI—VI in FIG. 3B. FIGS. 7 to 9 are flow charts showing the controlling of actions of the facsimile apparatus by a main control unit 12 during the picture image displaying time therein.

The facsimile apparatus, a mode of embodiment of the invention will now be described on the basis of what are shown in FIGS. 1 to 6.

Referring to FIGS. 1 to 3, a line control unit 2 for carrying out the capturing and releasing of a communication line 1 is connected to a change-over unit 3 made of a cross point switch and the like adapted to switch the object of connection of the communication line 1 captured by the line control unit 2. A modem 4 carries out the modulation and demodulation of data exchanged with an opposite communication terminal through the communication line 1 connected to the modem through the change-over unit 3. A speech control unit 5 is adapted to form a speech path between the facsimile apparatus and an opposite communication apparatus through the communication line 1 connected to the speech control unit through the change-over unit 3. A handset 6 carries out the telephone transmission and reception of voice by using the speech path formed by the speech control unit 5.

The main control unit 12 realized by a microcomputer is connected to a scanner 7 for reading picture image data from a manuscript; a printer 8 for printing a picture image based on the picture image data; a display unit 9 which displays a picture image based on the picture image data and has a substantially flat structure as a whole including a liquid crystal display panel; an operating unit 10 including a cross key 10a which is an operating unit for giving instructions to alter the content to be shown on the display unit 9, function keys 10b, a start key 10c, numeral/letter keys 10d, etc., and a memory 11 for storing picture image data based on data demodulated by the modem 4, picture image data read by the scanner 7, and various other kinds of data, such as telephone directory data and program data, respectively.

The main control unit 12 carries out the controlling of each part on the basis of the program data stored in the memory 11. The main control unit 12 has a function of converting the simple HTML (Hyper Text Makeup Language) data demodulated by the modem 4 into picture image data, a function of converting facsimile data demodulated by the modem 4 into picture image data, a function of converting picture image data, which are supplied from the scanner 7 and memory 11, into facsimile data, a function of connecting the facsimile apparatus to the nearest access point in accordance with an operation of the start key of the operating unit 10 and connecting the same to an internet, a function of converting the content of an operation of the operating unit 10 into an instruction signal on the internet, and a function of extracting in accordance with an operation of the operating unit 10 a desired telephone number from telephone directory data stored in the memory 11, and showing the telephone number on the display unit 9 or dial transmitting the same.

These line control unit 2, change-over unit 3, modem 4, speech control unit 5, handset 6, scanner 7, printer 8, display unit 9, operating unit 10, memory 11 and main control unit 12 constitute the facsimile apparatus. Out of these constituent parts 6 to 12, the display unit 9, cross key 10a, function keys 10b and start key 10c are provided on the outer surface 15 of the case unit B formed separately from the apparatus body A. The communication means for transmitting and receiving the transmission of data between each part 6 to 8, 10d, 11, 12 provided on the apparatus body A and that 9, 10a to 10c provided on the case unit B include a wire method using codes and a flexible board, etc. and a wireless method using IrDA (Infrared Data Association) and Bluetooth (Trade name), etc. Especially, when the case unit B is provided detachably with respect to the apparatus body A, it is recommended that the wireless method be used for the transmission of data between each part 6 to 8, 10d, 11, 12 provided on the apparatus body A and that 9, 10a to 10c provided on the case unit B.

The case unit B is provided in its front (or lower) portion with a pivot C, and is also provided on its rear side of the case unit B with a sliding contact member D, which may be called a substantially arcuate rib having a center on the longitudinal axis 21 of the pivot C. The pivot C supports the case unit B rotatably on the apparatus main body A. A brake member E of an elastic material, such as rubber, which is situated in the main body A, is pressed against the sliding contact member D, so that a frictional force produced between the sliding contact member D and the brake member E may act as a retaining force for preventing the rotation of the case unit B, so that when the operator has depressed the keys 10a to 10c in the operating unit 10 with fingers while the case unit B is in its first position, the case unit B may be held in its first position as shown by solid lines in FIG. 3A without making any angular displacement in the direction of an arrow 18 to its second position as shown by phantom lines 17 in FIG. 3A. The sliding contact member D has a sliding surface 19 held in frictional contact with the brake member E by its resilient force, and lying in an imaginary cylindrical surface having a center on the longitudinal axis 21 of the pivot C. When the case unit stays in its second position, the sliding contact member D is situated as shown by a reference numeral 29 in FIG. 3A. The longitudinal axis 21 is horizontal when the facsimile apparatus is in its position of normal use.

The case unit B has forwardly of the pivot C (or to the right thereof in FIG. 3A) a lower surface 32 that may abut against a stopper 33 defined by the upper surface of the main body A. The abutment of the lower surface 32 of the case unit B against the stopper 33 on the main body A prevents any further angular displacement of the case unit B about the pivot C in the direction of an arrow 34 after its angular displacement to its first position suitable for use as shown by the solid lines in FIG. 3A. Thus, it is reliably held in its first position.

The case unit B thus formed is provided on right side of the handset 6 at the top of the main body A. The cross key 10a provided on the case unit B is positioned away from the handset 6, i.e., on a proximal side (or lower side) right portion of the surface of the case unit B. The handset 6 is removably provided on the left upper portion of the main body A. Owing to this arrangement, the display unit 9 is not hidden from sight due to the right hand and right arm even when the cross key 10a is depressed with the right hand with the content to be shown on the display unit 9 observed as the handset 6 is used in order to perform a telephone communication by holding with the left hand. Therefore, even when the handset 6 is used, the cross key 10a can be operated smoothly as the content to be shown on the display unit 9 is observed.

The case unit B formed as described above is provided on left side of the numeral/letter keys 10d provided on the upper surface of the unit body A. The cross key 10a on this case unit B is provided on the side of the numeral/letter keys 10d, i.e., on the proximal side (or the lower portion of FIGS. 2A to 2C) right portion of the surface of the case unit B. This enables the transfer of an operation of the cross key 10a to that of the numeral/letter keys 10d, and the transfer of an operation of the numeral/letter keys 10d to that of the cross key 10a to be carried out smoothly by a key operation. Therefore, the operations of the cross key 10a and numeral/letter keys 10d, which are carried out as the content to be shown on the display unit 9 is observed, can be effected smoothly.

In FIG. 4, the longitudinal axis denoted by reference numeral 21 is shown in its position projected on an imaginary plane containing the cross and function keys 10a and 10b. The operating force produced by the fingers of the operator acts upon the imaginary plane containing the cross and function keys 10a and 10b substantially at right angle thereto. An upper operating element 22 is spaced rearward of the longitudinal axis 21 (or upward in FIG. 4) by a distance $\Delta L3$ as shown in FIG. 4. A lower operating element 23 has a distance $\Delta L4$ from the longitudinal axis 21, as shown in FIGS. 4 and 5.

The cross key 10a is of the construction having a substantially elliptic contour 26 defined by and surrounding the upper, lower, left and right operating elements 22 to 25, as shown in FIG. 4. The operating elements 22 to 25 are arranged in a cross having the central start key 10c located in its center. The contour 26 has between the upper and lower operating elements 22 and 23 a distance L1 which is shorter than the distance L2 between the left and right operating elements 24 and 25 (L1<L2). The short distance L1 enables the upper and lower operating elements 22 and 23 to be located as close to the longitudinal axis 21 shown in FIG. 4 as possible, so that it may be possible to reduce as much as possible the moment acting upon the case unit B about the longitudinal axis 21 as a result of key depressing. The long distance L2 between the left and right operating elements 24 and 25 nearly the longitudinal axis 21 in FIG. 4 facilitates the actuation of the left and right operating elements 24 and 25 by depressing with fingers.

The short distance L1 makes it possible to locate the cross key 10a close to the screen of the display 9 and reduce the length of the case unit B between its front to its rear edge and thereby its size, as well as making it easier to operate the cross key 10a, while watching the screen.

The cross key 10a is secured to the top plate 39 of the case unit B by an attaching member 41, as shown in FIG. 5.

The cross key 10a has a central cavity 27 in which the start key 10c is enclosed. The cross key 10a is, however, not limited in construction to what has been described, but may alternatively be of the construction having an operating lever 28 projecting upward from the top surface 15 of the case unit B and adapted for angular displacement or downward swinging to actuate any of the upper, lower, left and right operatings, as will be described with reference to FIG. 19.

The upper operating element 22 of the cross key 10a and the function keys 10b are so arranged as to be positioned substantially exactly above the longitudinal axis 21 shown in FIG. 4 of the pivot C. It, therefore, follows that when the upper (or rear) operating element 22 or any of the function keys 10b has been depressed by an operating force in the direction of an arrow 31, the force acts upon the pivot C substantially exactly above its longitudinal axis 21. Therefore, the operating force produces only a small moment causing the case unit B to rotate about the longitudinal axis 21. Moreover, the frictional force produced between the sliding contact member D and the brake member E holds the case unit B against any undesirable angular displacement of the case unit B about the longitudinal axis 21 in the direction of an arrow 18 as shown in FIG. 3A, when such depressing has been made.

The application of an operating force to any of the left, right and lower (or proximal) operating elements 24, 25 and 23 of the cross key 10a and the start key 10c located below (or on the proximal side of) the longitudinal axis 21 in FIG. 4 imparts to the case unit B a moment causing it to turn about the longitudinal axis 21 in the direction 34 in which the case unit B is lifted. The application of any force larger than what is required for actuating any such key imparts such moment in the direction of the arrow 34 to the case unit B. As a result, the lower surface 32 of the case unit B abuts against the stopper 33, while a frictional force prevails between the sliding contact member D and the brake member E, as stated before. Thus, the case unit B can be kept in its second position.

When, for example, the lower operating element 23 of the cross key 10a is depressed, an operating force F1 expected from the normal operation of the cross key 10a amounts to about 120 gf and acts upon a point having a distance $\Delta L3=20$ mm from the longitudinal axis 21 of the pivot C. The sliding contact member D in the form of a rib and the frictional member E made of rubber produce a retaining force of about 1.2 kgf that acts upon the sliding surface 19 having a distance of 30 mm from the longitudinal axis 21 of the pivot C.

Comparison is made of the moments tending to rotate the case unit B. The force acting to retain the case unit B against rotation produces a moment M1 of about 36 ($=1.2\times30$) kgf·mm. The operating force F1 of the cross key 10a tending to rotate the case unit B produces a moment M2 of 2.4 ($=0.12\times20$) kgf·mm. The angle holding moment M3 required to allow the case unit B to stay in its first position as shown in FIG. 3A is a negligibly small value, and as M1>M2, the force for holding the case unit B at any desired angle is not affected, but the case unit B is held in its first position without undergoing any undesirable angular displacement in the direction of the arrow 34 when the lower operating element 23 has been depressed. Therefore, no additional holding mechanism is necessary, but a corresponding reduction of cost is possible.

An operating force F2 of about 1.8 kgf ($=36/20$) is required for depressing the lower operating element 23 of the cross key 10a and rotating the case unit B about the longitudinal axis 21. Accordingly, the operating force F1 of 120 gf required for the normal use of the cross key 10a as stated above does not affect the case unit B held at the desired angle.

An angle holding moment M3 of, say, 11 kgf·mm is required for holding the case unit B in its first position as shown in FIG. 3A. Description will now be made of another example of embodiment where the lower operating element 23 of the cross key 10a is situated on the longitudinal axis 21 of the pivot C, or the pivot C has its longitudinal axis positioned as shown by a reference numeral 21a in FIGS. 4 and 5. In this case unit, the depressing of the upper operating element 22 produces a moment M4 of 13.4 kgf·mm (M2+M3). As the value of 13.4 kgf·mm is small enough to avoid the possibility of the maintenance of the case unit B at its desired angle being affected (M1>M4), the cross key 10a may have its lower operating element 23 situated on the longitudinal axis 21a of the pivot C. For the same reason, the function keys 10b may be situated not on the longitudinal axis 21 of the pivot C, but in its vicinity according to still another example of embodiment.

As the cross key 10a is situated close to the right and proximal corner of the case unit B, while the sliding contact member D in the form of a rib is situated toward the left and rear corner of the case unit B, so that the lines along which they are rotatable may not cross each other, or in other words, as the cross key 10a and the sliding surface 19 are displaced from each other along the longitudinal axis 21, the depressing of the cross key 10a imparts a resilient twisting force about the longitudinal axis 21 to the case unit B, and the left and right pivots C for the case unit B become eccentric to each other and fail to rotate smoothly in the bearings 36 and 37 in which they are rotatably supported. Thus, it is possible to reduce any adverse effect that the operating force applied to the cross key 10a may exert on the maintenance of the case unit B at its desired angle.

The function key 10b shown in FIG. 6 is secured to the top plate 39 of the case unit B by an attaching member 42. The bearings 36 and 37 are supported by brackets 43 and 44 projecting from the apparatus main body A, respectively. The cross and start keys 10a and 10c have upper surfaces parallel to the upper surface 15 of the case unit B, the screen of the display 9 and the longitudinal axis 21 of the pivots. The function keys 10b have a distance $\Delta L5$ from the longitudinal axis 21, as shown in FIG. 6. In the example of embodiment as described above, $\Delta L3$ may be 0, or $\Delta L5$ may be 0, or $\Delta L3$ may not be 0, but $\Delta L4$ may be 0.

The actions of the facsimile apparatus, which is formed as mentioned above, during a picture image displaying operation thereof will now be described on the basis of the flow charts shown in FIGS. 7 to 9.

The main control unit 12 not connected to the communication line 1, i.e., on standby monitors (steps S1, S2) the pressed condition of the menu key and start key 10c in the operating unit 10. When the menu key is pressed in such a condition, picture image data are read from the memory 11, and the data are shown (step S5) on the display unit 9.

When the start key 10c is pressed, the main control unit 12 controls the line control unit 2 and carries out the connection thereof to the nearest access point, and to an internet which is a network (step S3). The main control unit also controls the change-over unit 3, and switches (step S4) the object of connection of the communication line 1, which is connected to the main control unit through the communication line control unit 2, to the modem 4. A picture image based on picture image data demodulated by this modem 4 and converted thereinto by the main control unit 12 is shown (step S5) on the display unit 9.

When a picture image is shown on the display unit 9, the main control unit 12 judges (step S6) whether the picture image is a menu picture image or not, or whether the picture image is a picture image, such as a facsimile reception picture image and a simple HTML picture image or not. When a judgment that the displayed picture image is a menu picture image is given, a key control operation in accordance with the menu picture image is carried out (step S7). When a judgment that the displayed picture image is picture image data is given, a key control operation in accordance with the picture image data is carried out (step S8).

The control operation in accordance with the menu picture image is carried out as shown in FIG. 8. When the cross key 10a is pressed (step S11), the cursor 13 (see FIG. 3) shown on the display unit 9 is moved vertically and horizontally (step S12) correspondingly to the pressed upper, lower, left and right operating elements. When the function keys 11b are pressed (step S13), the functions shown on the display unit 9 correspondingly to the pressed upper, lower, upper and lower operating elements are performed (step S16). When the start key 10c is pressed (step S14), the function selected by the cursor is performed (step S15).

The key control operation in accordance with the picture image data is carried out as shown in FIG. 9. When the cross key 10a is pressed (step S21), the picture image shown on the display unit 9 is scrolled vertically and horizontally (step S22) correspondingly to the upper, lower, left and right operating elements. When the function keys 11b are pressed (step S23), the functions shown on the display unit 9 are performed (step S26). When the start key 10c is pressed (step S24), the picture image data corresponding to the picture image shown on the display unit 9 are supplied to the printer 8 and printed (step S25) on predetermined paper.

Therefore, according to these action control methods, an operation based on the picture image shown an the display unit 9 can be carried out by the cross key 10a, function keys 10b and start key 10c provided nearly the display unit 9. Since the display unit 9, cross key 10a, function keys 10b and start key 10c are provided on the case unit B joined pivotably to the apparatus body A, the key operating actions can be made smoothly even when the case unit B is raised and held in a position in which the content to be shown on the display unit 9 can be seen easily. Moreover, since the case unit 8 is not turned inadvertently by the operation of these keys, this apparatus can be used very conveniently.

Although in this mode of embodiment, a case unit where the cross key 10a is provided on the surface of the case unit B is described, the present invention is not limited thereto. A jog dial type operating unit (FIG. 16), a track ball type operating unit (FIGS. 14 and 15) and a roller type operating unit (FIGS. 10 to 13) may be provided on the case unit B as described later. Even in such a case unit, the operation and effect identical with those of the cross key 10a can be displayed.

Figure 10:
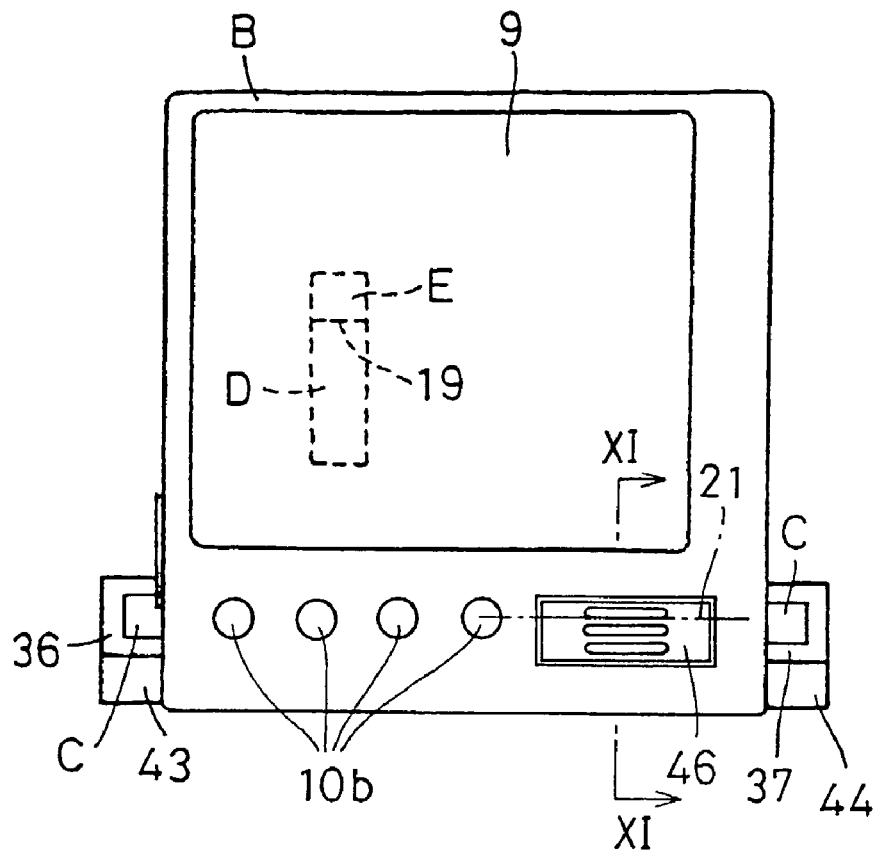
FIG. 10 is a front elevational view similar to FIG. 3B, but showing another form of case unit B embodying this invention.
Figure 11:
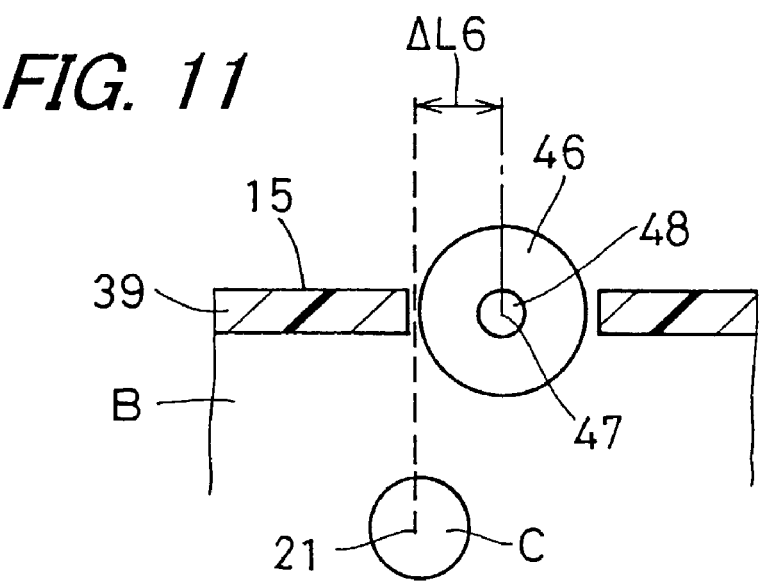
FIG. 11 is a simplified sectional view taken along the line XI—XI in FIG. 10.

FIG. 10 is a front elevational view similar to FIG. 3B, but showing another form of case unit B embodying this invention in its first position, and FIG. 11 is a simplified sectional view taken along the line XI—XI in FIG. 10. This form of embodiment is similar to the embodiment as described with reference to FIGS. 1 to 9, and the same reference numerals are used to denote the corresponding parts. This form of embodiment is particularly featured by an operating roller 46 replacing the cross key 10a in the operating unit 10 as described before. The operating roller 46 is supported on the case unit B rotatably by a rotary shaft 48 having a longitudinal axis 47 that is parallel in an imaginary plane to the longitudinal axis 21 of the pivots C. The longitudinal axes 21 and 47 have a distance $\Delta L6$ from each other. The operating roller 46 is rotatable to perform the same functions as those of the cross and start keys 10a and 10c as described before.

Figure 12:
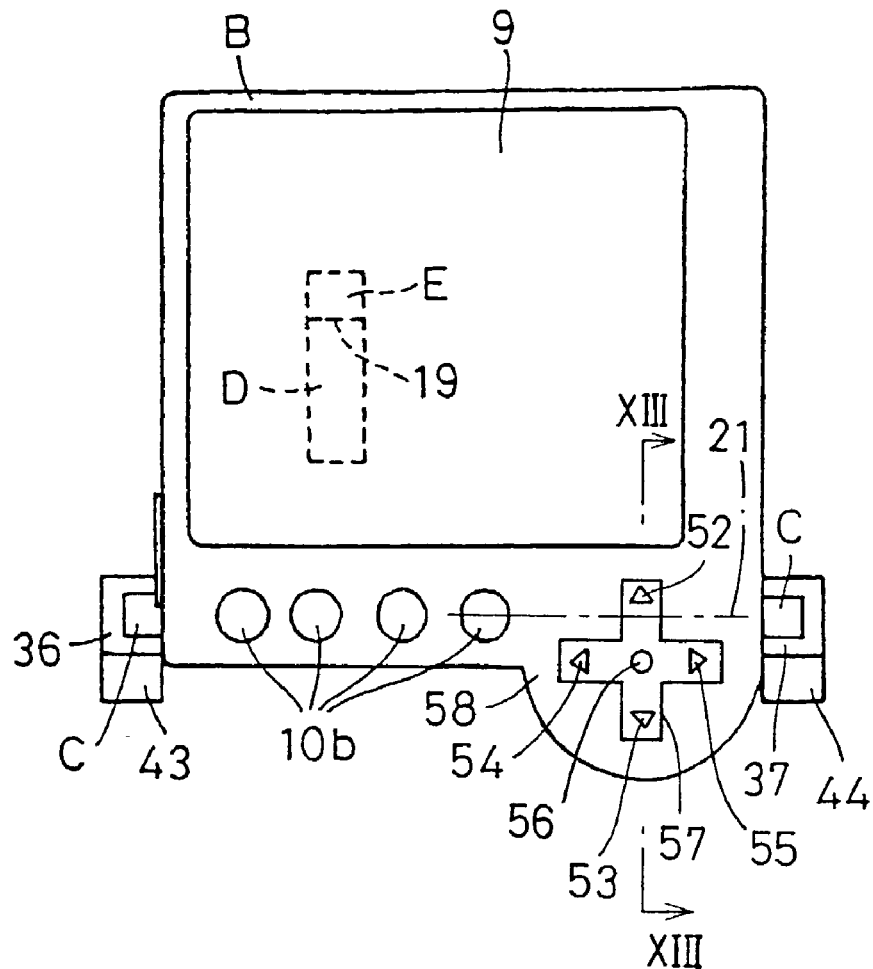
FIG. 12 is a front elevational view similar to FIG. 3B, but showing still another form of case unit B embodying this invention in its second position.
Figure 13:
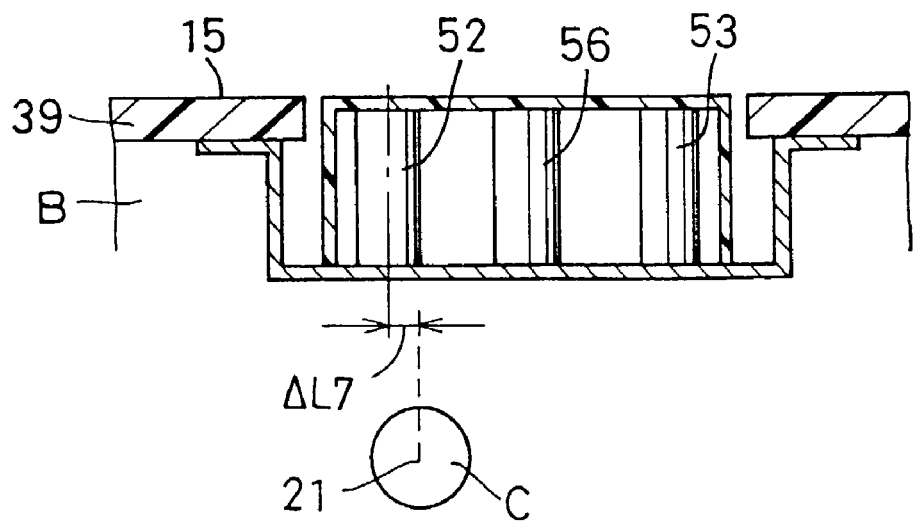
FIG. 13 is a simplified sectional view taken along the line XIII—XIII in FIG. 12.

FIG. 12 is a front elevational view similar to FIG. 3B, but showing still another form of case unit B embodying this invention in its first position, and FIG. 13 is a simplified sectional view taken along the line XIII—XIII in FIG. 12. The embodiment shown in FIGS. 12 and 13 is similar to the embodiment as described with reference to FIGS. 1 to 9, and the same reference numerals are used to denote the corresponding parts. This form of embodiment is particularly featured by an upper operating element 52, a lower operating element 53, a left operating element 54 and a right operating element 55, and a start key 56 situated in the center surrounded by the operating elements 52 to 55, which replace the cross and start key 10a and 10c as described before. The operating elements 52 to 55 are situated in an area 57 shaped in a cross.

The longitudinal axis 21 of the pivots C lies, for example, between the upper operating element 52 and the start key 10c and has a distance $\Delta L7$ from the upper operating element 52, as shown in FIG. 13. According to still another embodiment of this invention, the longitudinal axis 21 may be so positioned as to lie immediately below the upper operating element 52, or immediately below an imaginary line 58 extending through the left and right operating elements 54 and 55 and the start key 56, or between the lower operating element 53 and the imaginary line 58.

Figure 14:
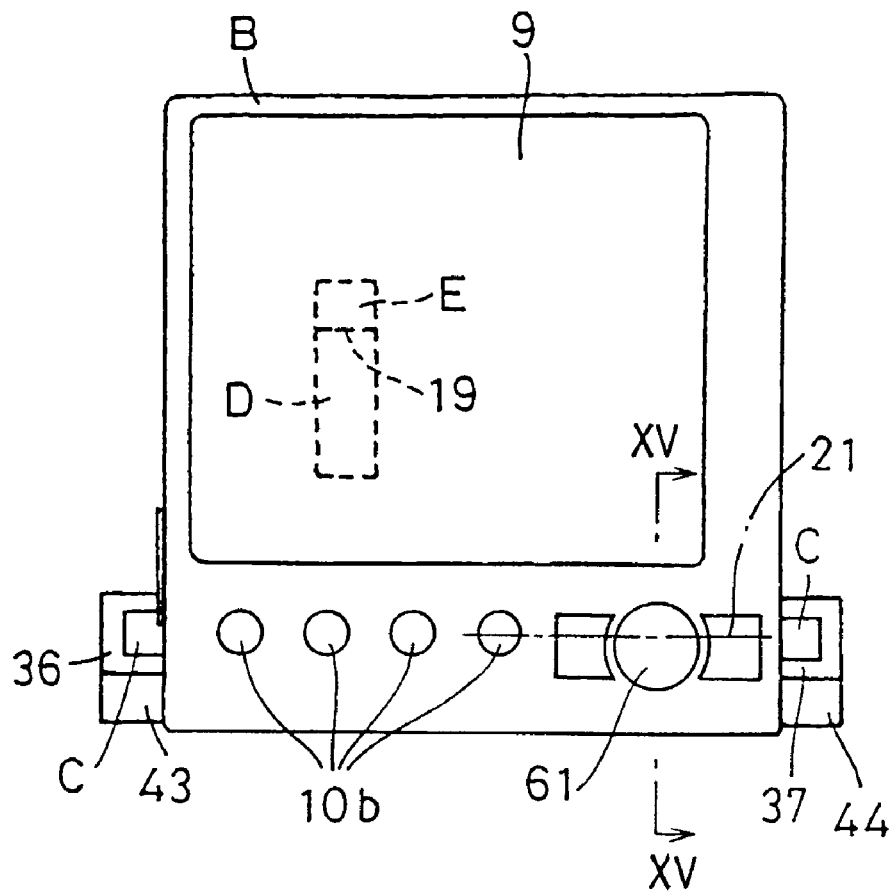
FIG. 14 is a front elevational view similar to FIG. 3B, but showing still another form of case unit B embodying this invention in its first position.
Figure 15:
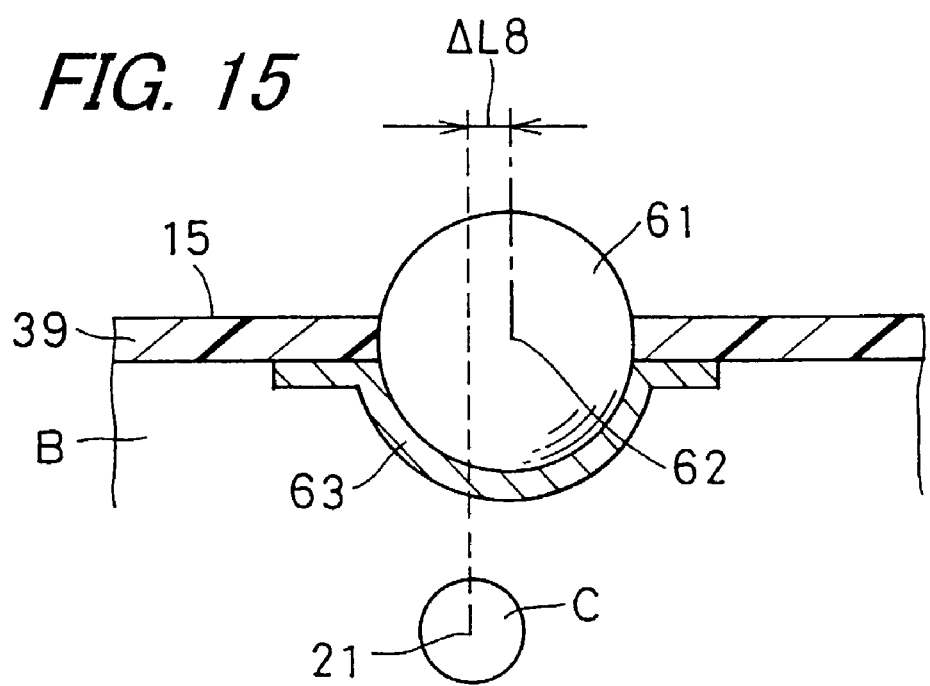
FIG. 15 is a simplified sectional view taken along the line XV—XV in FIG. 14.

FIG. 14 is a front elevational view similar to FIG. 3B, but showing still another form of case unit B embodying this invention in its first position, and FIG. 15 is a simplified sectional view taken along the line XV—XV in FIG. 14. This embodiment is similar to the embodiment as described with reference to FIGS. 1 to 9, and the same reference numerals are used to denote the corresponding parts. This form of embodiment is particularly featured by a track ball 61 replacing the cross and start keys 10a and 10c in the operating unit 10. The ball 61 is operable by the operator for angular displacement about its own center 62. A bearing member 63 supports the ball 61 on the top plate 39 of the case unit B in such a way that it may be capable of angular displacement. The longitudinal axis 21 of the pivots C has a distance ΔL8 from the axis 62 of the ball 61.

Figure 16:
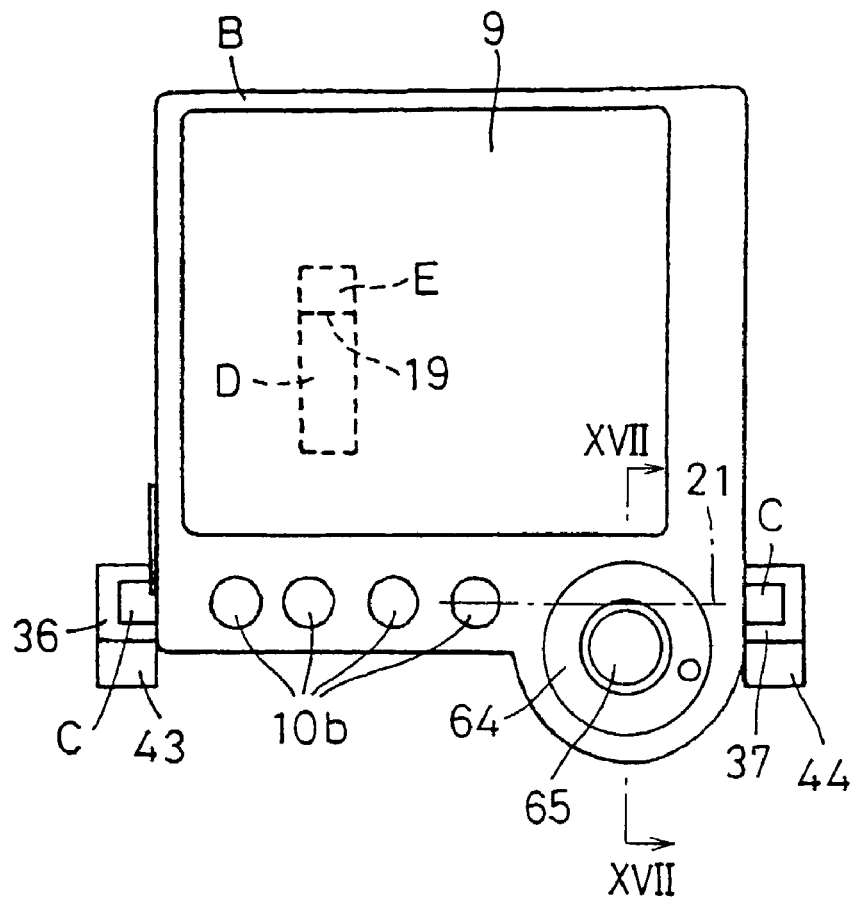
FIG. 16 is a front elevational view similar to FIG. 3B, but showing still another form of case unit B embodying this invention in its first position.
Figure 17:
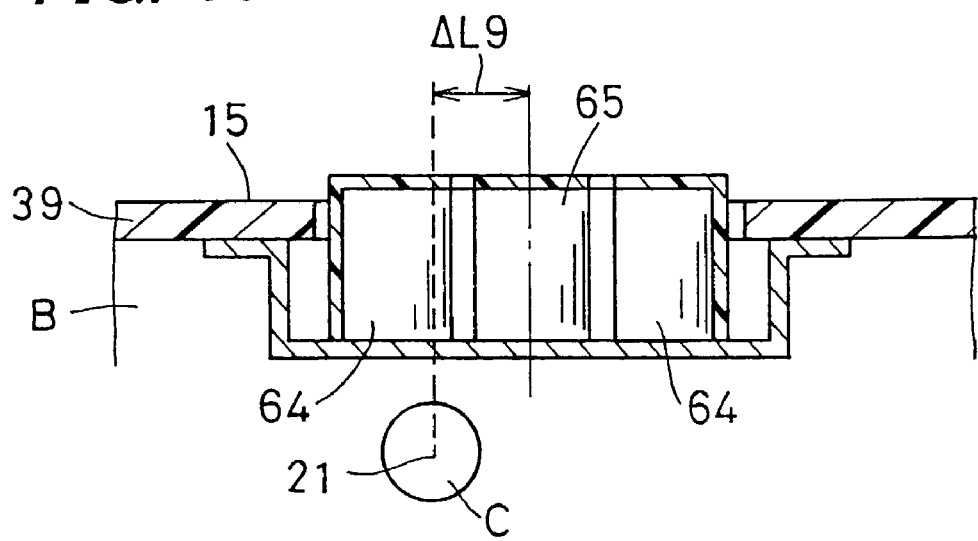
FIG. 17 is a simplified sectional view taken along the line XVII—XVII in FIG. 16.

FIG. 16 is a front elevational view similar to FIG. 3B, but showing still another form of case unit B embodying this invention in its first position, and FIG. 17 is a simplified sectional view taken along the line XVII—XVII in FIG. 16. This embodiment is similar to the embodiment as described with reference to FIGS. 1 to 9, This form of embodiment is particularly featured by having a rotatable operating ring 64 and a start key 10c situated in the center of the operating ring 64. The operating ring 64 has a circular shape in its front elevation as shown in FIG. 16. The operating ring 64 has an axis having a distance ΔL9 from the longitudinal axis 21 of the pivots C. The angular displacement of the operating ring 64 performs the functions of the cross key 10a as described before.

Figure 18:
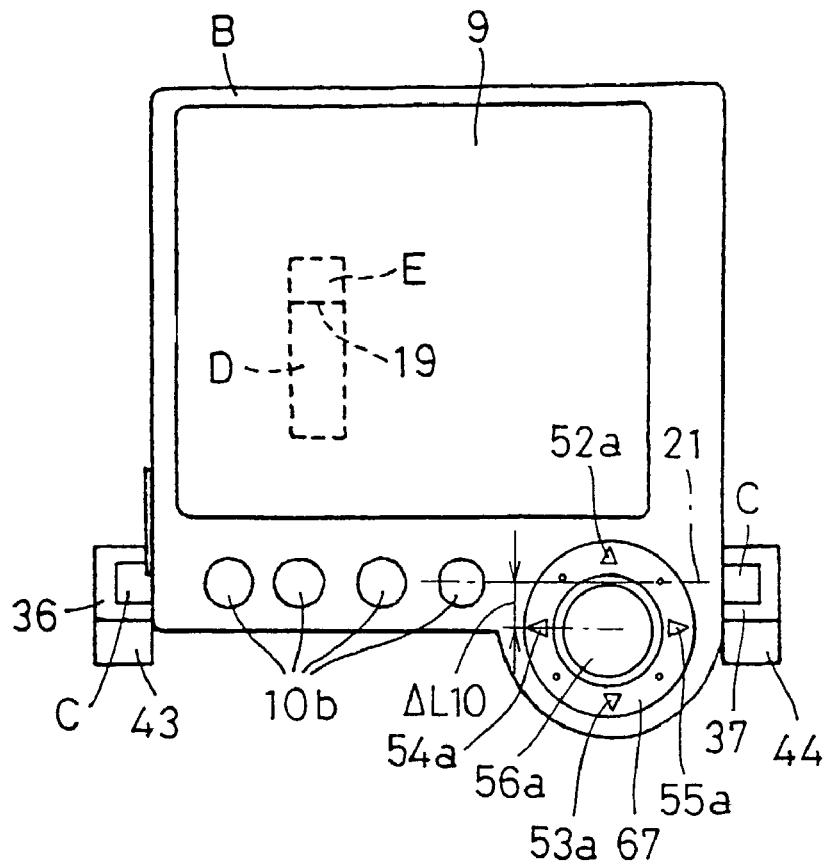
FIG. 18 is a front elevational view similar to FIG. 3B, but showing a still different form of case unit B embodying this invention.

FIG. 18 is a front elevational view similar to FIG. 3B, but showing still another form of case unit B embodying this invention. This embodiment is similar to the embodiments as described with reference to FIGS. 1 to 9 and FIG. 12, and the same reference numerals, or the same numerals accompanied by letter 'a' are used to denote the corresponding parts. The upper, lower, left and right operating elements 52a, 53a, 54a and 55a are situated in an annular area 67 encircling a central operating element 56a serving as a start key. The area 67 has an axis spaced downward (or forward) from the longitudinal axis 21 of the pivots C by a distance ΔL10.

Figure 19:
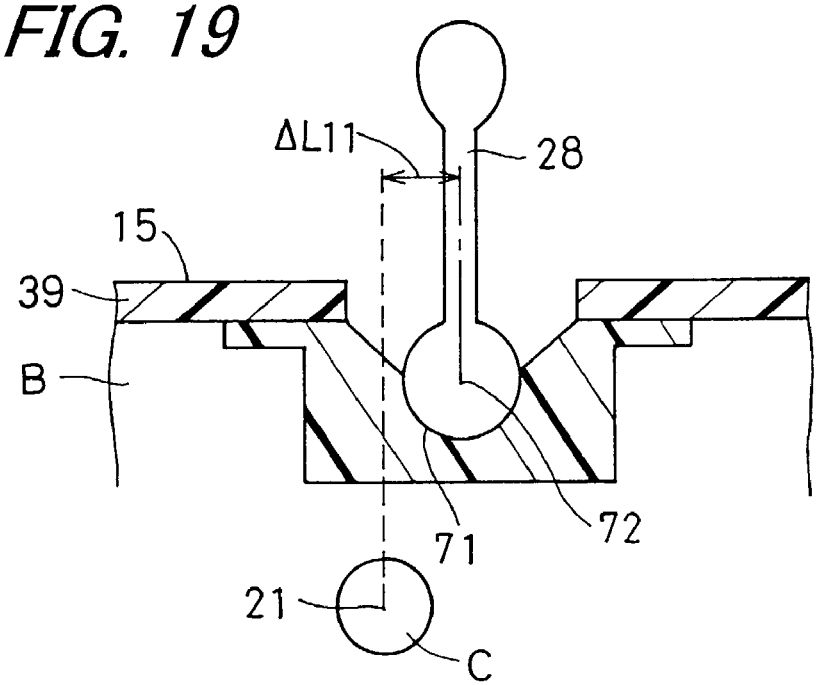
FIG. 19 is a front elevational view similar to FIG. 3B, but showing a still different form of case unit B embodying this invention.
Figure 20A:
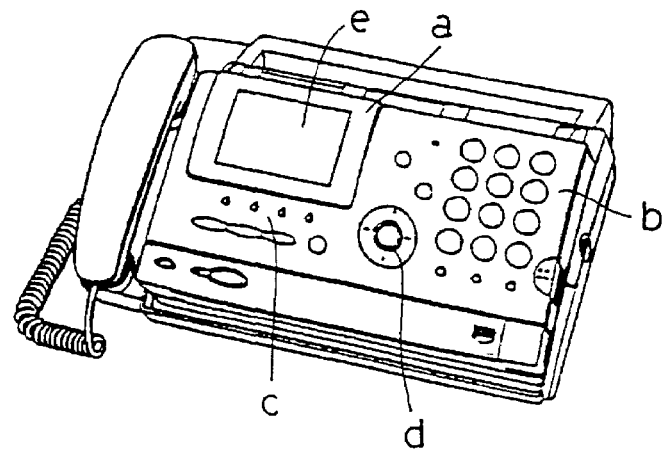
Figure 20B:
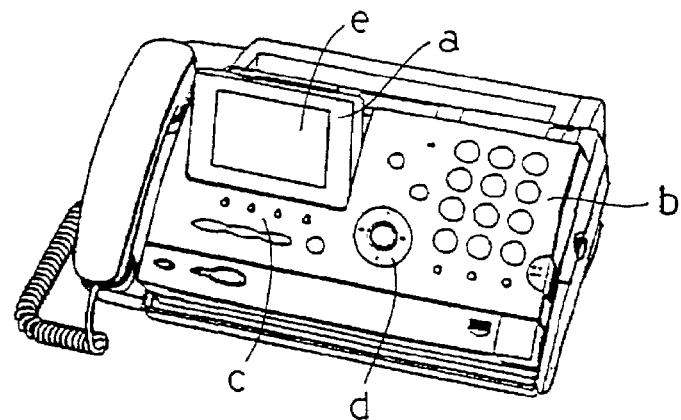
Figure 20C:
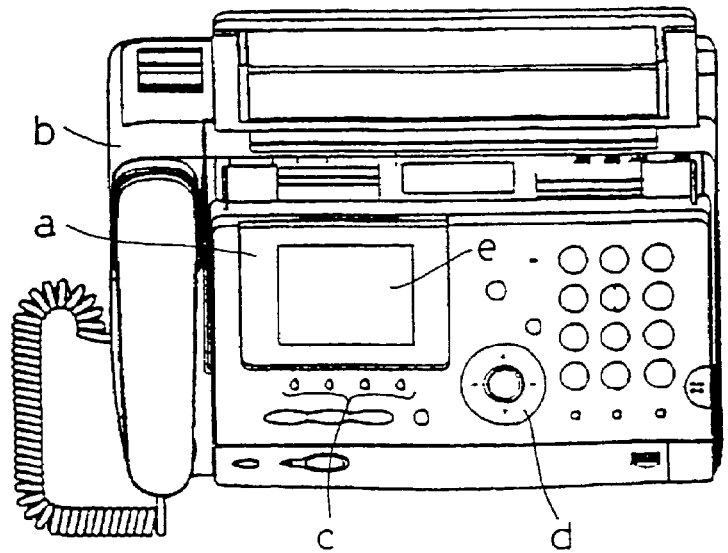

FIG. 19 is a simplified sectional view of a part of a still different form embodying this invention. This embodiment is featured by having an operating lever 28 supported by a bearing for 71 angular displacement. The operating lever 28 has at its base a center 72 of swinging spaced forward (or to the right in FIG. 19) from the longitudinal axis 21 of the pivots C by a distance ΔL11. The operating lever 29 is allowed to stay substantially at right angles to the surface 15 of the top plate 39 as shown in FIG. 19, and performs the same functions as those of the cross key 10a as described before if the operator causes the lever 28 to swing about its center 72 of swinging for angular displacement. The embodiment shown in FIG. 19 is otherwise similar in construction to what has been described above in the embodiments 11 to 19.

According to a still different form of embodiment, the frictional force produced between the pivots C and the bearings 36 and 37 may be employed instead of the combination of the sliding contact member D and the brake member E for holding the unit against any undesirable angular displacement from its first position by the depressing force applied to any of the keys 10a to 10c in the operating unit 10. The same is the unit with the operating roller 46 shown in FIG. 10, the operating elements 52 to 55 and the start key 56 in FIGS. 12 and 13, the track ball 61 in FIGS. 14 and 15, the operating ring 64 and the start key 10c in FIGS. 16 and 17, the operating elements 52a to 56a in FIG. 18 and the operating lever 28 in FIG. 19.

According to a still different form of embodiment, it is alternatively possible to have the keys 10a to 10c displayed in the screen of the display 9 and include in the display 9 a transparent coordinate position detector for detecting and inputting any key that has been depressed or touched.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A stationary electronic apparatus comprising:
   an apparatus main body;
   a case unit joined to the apparatus main body so as to be angularly displaced about an axis of a pivot of the case unit, the case unit having a display screen provided on a surface thereof, and
   an operating unit provided on the surface, for giving instructions to alter contents to be shown on the display screen, the operating unit being disposed nearly directly above the axis of the pivot.

2. The stationary electronic apparatus of claim 1, wherein the case unit is disposed on an upper surface of the apparatus main body and joined thereto so that the case unit can be angularly displaced between a first position in which the case unit is raised and a second position in which the case unit overlies the upper surface of the apparatus.

3. The stationary electronic apparatus of claim 1, wherein the operating unit is disposed above the axis of the pivot.

4. The stationary electronic apparatus of claim 1, wherein the operating unit is disposed in a proximal side right portion of the case unit.

5. The stationary electronic apparatus of claim 1, wherein an upper operating element of the operating unit is provided nearly directly above the axis of the pivot.

6. The stationary electronic apparatus of claim 1, wherein the operating unit is constituted so that a distance between upper and lower operating elements is set shorter than that of between left and right operating elements.

7. The stationary electronic apparatus of claim 1, wherein the case unit is provided so as to be angularly displaced about the axis of the pivot, and a substantially arcuate sliding contact member extending around the pivot is provided on a rear surface of the case unit, a retaining force obstructing a pivotal movement of the case unit being applied to the sliding contact member, the operating unit and sliding contact member being arranged in positions of different rotational actions.

8. A display apparatus joined to a stationary electronic apparatus so as to be angularly displaced about an axis of a pivot of the display apparatus, comprising:
   a display screen disposed on a surface of the display apparatus; and
   an operating unit for giving instructions to alter contents to be shown on the display screen, the operating unit being provided nearly directly above the axis of the pivot.

9. The stationary electronic apparatus of claim 1, wherein the operating unit is a key operated by depressing or touching.

10. The stationary electronic apparatus of claim 1, wherein the operating unit is a unit operated by angular displacement.

11. A communication apparatus, comprising:
a main body; and
a case unit joined to the apparatus main body pivotably about an axis of a pivot of the case unit, the case unit including a display screen for displaying a picture image based on data sent from a communication line and an operating unit provided on a surface of the case unit for scrolling picture images displayed on the display screen, on the basis of an operation of the operating unit, the operating unit being provided nearly directly above the axis of the pivot.

12. A communication apparatus comprising:
a main body; and
a case unit joined to the apparatus main body pivotably about an axis of a pivot of the case unit, including a display screen for displaying a menu picture image based on data sent from a communication line, and an operating unit provided on the surface of the case unit for moving a cursor, which is shown on the display screen, on the basis of an operation of the operating unit, the operating unit being provided nearly directly above the axis of the pivot.

13. The communication apparatus of claim 11, further comprising:
a handset disposed on the apparatus body, for communicating with another apparatus connected thereto via a communication line, wherein the case unit is provided on one side of the handset, and the operating unit is provided in a position away from the side on which the handset is provided.

14. The communication apparatus of claim 11, wherein a handset for telephone communication including a microphone and a speaker is removably installed on the left-hand side of the apparatus main body, the case unit is located to the right of the handset on the apparatus main body, the operating unit is located in a portion of the case unit more to the proximal side than the display screen and toward the right-hand end thereof, and the apparatus main body further includes another operating unit located to the right of the case unit.

15. The stationary electronic apparatus of claim 1, wherein the pivot is disposed in a proximal side portion of the case unit.

16. The communication apparatus of claim 12, further comprising:
a handset disposed on the apparatus body, for communicating with another apparatus connected thereto via a communication line, wherein the case unit is provided on one side of the handset, and the operating unit is provided in a position away from the side on which the handset is provided.

17. The communication apparatus of 12, wherein a handset for telephone communication including a microphone and a speaker is removably installed on the left-hand side of the apparatus main body, the case unit is located to the right of the handset on the apparatus main body, the operating unit is located in a portion of the case unit more to the proximal side than the display screen and toward the right-hand end thereof, and the apparatus main body further includes another operating unit located to the right of the case unit.

18. The stationary electronic apparatus of claim 1, wherein the operating unit is positioned such that a plane normal to the operating unit intersects the axis.

19. The stationary electronic apparatus of claim 1 wherein said case is shiftable between a first stop position and a second stop position and wherein said operating unit is accessible when said case unit is at said first stop position and at said second stop position.

* * * * *